US012623685B2

(12) United States Patent
　　Kawano

(10) Patent No.: US 12,623,685 B2
(45) Date of Patent: May 12, 2026

(54) AUTONOMOUS DRIVING VEHICLE

(71) Applicant: TOYOTA JIDOSHA KABUSHIKI KAISHA, Toyota (JP)

(72) Inventor: Taiki Kawano, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 18/667,532

(22) Filed: May 17, 2024

(65) Prior Publication Data

US 2024/0391491 A1 　　Nov. 28, 2024

(30) Foreign Application Priority Data

May 22, 2023　(JP) ................................. 2023-083950

(51) Int. Cl.
　　*B60W 60/00* 　　(2020.01)
　　*B60W 40/04* 　　(2006.01)
　　*B60W 50/00* 　　(2006.01)
　　*B60W 50/06* 　　(2006.01)
　　*B60W 50/14* 　　(2020.01)

(52) U.S. Cl.
　　CPC .......... *B60W 60/001* (2020.02); *B60W 40/04* (2013.01); *B60W 50/06* (2013.01); *B60W 50/14* (2013.01); *B60W 2050/0062* (2013.01)

(58) Field of Classification Search
　　CPC .... B60W 60/001; B60W 40/04; B60W 50/06; B60W 50/14; B60W 2050/0062; B60W 2050/146; B60W 60/0011; G05B 19/0423; G05B 2219/25257; G01C 21/3453
　　See application file for complete search history.

(56) References Cited

U.S. PATENT DOCUMENTS

| | | | | |
|---|---|---|---|---|
| 11,640,562 B1* | 5/2023 | Badithela | ................. | G06N 7/01 |
| | | | | 706/12 |
| 2013/0211656 A1* | 8/2013 | An | ........................ | G05D 1/0274 |
| | | | | 701/25 |
| 2018/0173227 A1* | 6/2018 | Mukai | ............... | B60W 60/0051 |
| 2019/0011914 A1* | 1/2019 | Park | .................. | B60W 60/0057 |
| 2020/0150654 A1* | 5/2020 | Isele | ...................... | G06N 3/094 |
| 2020/0164895 A1* | 5/2020 | Boss | ................. | B60W 60/0053 |
| 2020/0209885 A1 | 7/2020 | Kitagawa et al. | | |

(Continued)

FOREIGN PATENT DOCUMENTS

| | | |
|---|---|---|
| JP | 2019-074359 A | 5/2019 |
| JP | 2020-153939 A | 9/2020 |

(Continued)

*Primary Examiner* — Fadey S. Jabr
*Assistant Examiner* — Faris Asim Shaikh
(74) *Attorney, Agent, or Firm* — Dinsmore & Shohl LLP

(57) ABSTRACT

The vehicle of the present disclosure includes at least one processor and at least one memory storing a plurality of instructions executed on the at least one processor. The plurality of instructions causes the at least one processor to select a candidate route to a destination and acquire information on a traffic environment of the selected candidate route. The plurality of instructions further causes the at least one processor to simulate, based on the information on the traffic environment, reliability in a case where the vehicle travels on the selected candidate route by the autonomous driving using a trained model for autonomous driving, and output a result of the simulation.

4 Claims, 6 Drawing Sheets

(56) References Cited

U.S. PATENT DOCUMENTS

| | | | |
|---|---|---|---|
| 2020/0302233 A1 | 9/2020 | Iwasaki | |
| 2020/0312147 A1* | 10/2020 | Xia | G06F 16/252 |
| 2020/0341475 A1* | 10/2020 | Matsuda | B60P 3/11 |
| 2021/0142526 A1* | 5/2021 | Mantyjarvi | G06T 11/00 |
| 2021/0382491 A1* | 12/2021 | Murotani | G05D 1/0061 |
| 2022/0009505 A1* | 1/2022 | Fukushima | B60W 50/0097 |
| 2022/0126878 A1 | 4/2022 | Moustafa et al. | |
| 2022/0135069 A1* | 5/2022 | Matsumoto | G08G 1/0129 |
| | | | 701/25 |
| 2022/0176995 A1* | 6/2022 | Subramanian | B60W 30/08 |
| 2022/0234625 A1 | 7/2022 | Anabuki et al. | |
| 2022/0284470 A1* | 9/2022 | Gee | G06Q 30/0251 |
| 2023/0017377 A1 | 1/2023 | Watanabe | |
| 2023/0140584 A1* | 5/2023 | Stenneth | G01C 21/3878 |
| | | | 701/423 |
| 2023/0339496 A1* | 10/2023 | Yamashita | G08G 1/0129 |
| 2023/0347882 A1* | 11/2023 | Tian | B60W 40/04 |
| 2023/0373529 A1* | 11/2023 | Tomov | B60W 60/0027 |
| 2023/0399028 A1* | 12/2023 | Yamabe | B60W 60/005 |
| 2023/0419113 A1* | 12/2023 | Genc | G06F 16/904 |
| 2024/0286620 A1* | 8/2024 | Ito | A61B 5/7275 |

FOREIGN PATENT DOCUMENTS

| | | |
|---|---|---|
| JP | 2020-173264 A | 10/2020 |
| JP | 2021-140309 A | 9/2021 |
| JP | 2022-525586 A | 5/2022 |
| WO | 2019/116423 A1 | 6/2019 |
| WO | 2021/153382 A1 | 8/2021 |

* cited by examiner

AUTONOMOUS DRIVING VEHICLE

CROSS-REFERENCE TO RELATED APPLICATION

The present application claims priority under 35 U.S.C. § 119 to Japanese Patent Application No. 2023-083950, filed on May 22, 2023, the contents of which application are incorporated herein by reference in their entirety.

BACKGROUND

Field

The present disclosure relates to a vehicle travelable by autonomous driving.

Background Art

In recent years, an autonomous driving technique for determining vehicle control based on information from an in-vehicle sensor or the like by using a trained model generated by machine learning has been developed. In WO 2019/116423, a method is proposed for collecting training data that can be used in the machine learning to generate the trained model.

However, when the environment surrounding the vehicle changes, the inference result by the trained model may change. Therefore, the range in which the vehicle control can be appropriately executed using the trained model may change according to the traffic environment such as weather, time zone, and traffic volume. As a result, a situation may occur in which a user who expects autonomous driving is forced to perform manual driving operation.

As documents showing the technical level of the technical field related to the present disclosure, JP2020-153939A, JP 2019-074359A, and JP2020-173264A can be exemplified in addition to WO2020/116423A.

SUMMARY

An object of the present disclosure is to provide a technique for ensuring predictability of whether or not autonomous driving is executable.

In order to achieve the above object, the present disclosure provides a vehicle travelable by autonomous driving. The vehicle of the present disclosure includes at least one processor and at least one memory storing a plurality of instructions executed on the at least one processor. The plurality of instructions causes the at least one processor to select a candidate route to a destination and acquire information on a traffic environment of the selected candidate route. The plurality of instructions further causes the at least one processor to simulate, based on the information on the traffic environment, reliability in a case where the vehicle travels on the selected candidate route by the autonomous driving using a trained model for autonomous driving, and output a result of the simulation.

Whether the vehicle can travel on a certain route by autonomous driving depends on the traffic environment. In addition, parameters of the trained model used for automated driving differ depending on the conditions under which trained model was trained. Therefore, even if the traffic environment is the same, all vehicles are not necessarily equally capable of autonomous driving, and conversely, are not necessarily equally incapable of autonomous driving. According to the vehicle of the present disclosure, by inputting information on the traffic environment of a selected candidate route to the trained model for autonomous driving, it is possible to simulate the reliability in a case where the vehicle travels on the candidate route by autonomous driving. Then, by outputting the result of the simulation, it is possible to ensure predictability of whether or not autonomous driving is executable.

DETAILED DESCRIPTION

1. Autonomous Driving of Vehicle

Figure 1:
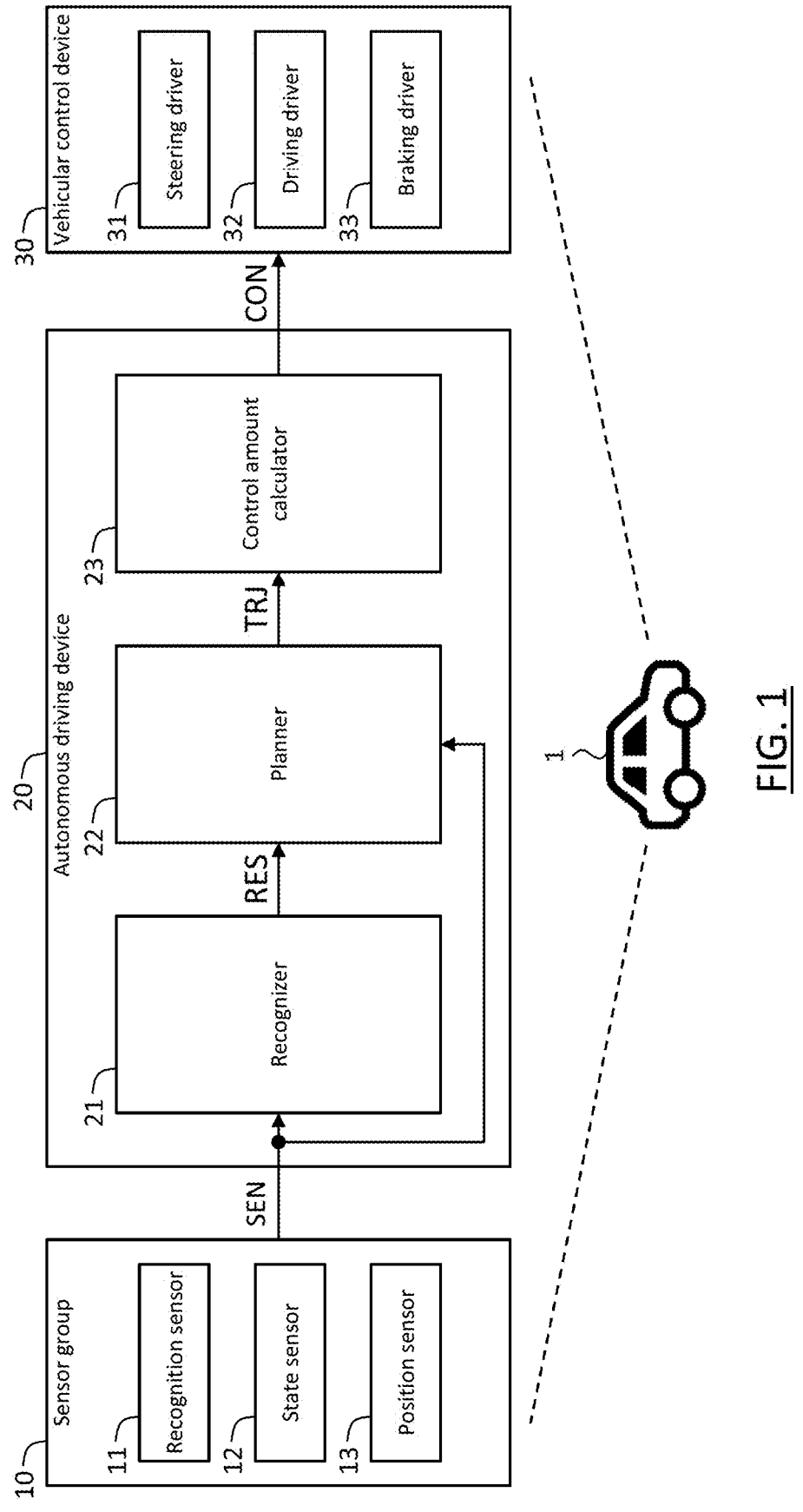
FIG. 1 is a block diagram illustrating a configuration example related to autonomous driving of a vehicle according to an embodiment.

FIG. 1 is a block diagram illustrating a configuration example related to autonomous driving of a vehicle 1 according to the present embodiment. The autonomous driving is to autonomously perform at least one of steering, acceleration, and deceleration of the vehicle 1 without depending on a driving operation by the user of the vehicle 1. The autonomous driving is a concept including not only fully autonomous driving but also risk avoidance control, lane keep assist control, and the like.

The vehicle 1 includes a sensor group 10, an autonomous driving device 20, and a car controller 30.

The sensor group 10 includes a recognition sensor 11 used for recognizing a situation around the vehicle 1. Examples of the recognition sensor 11 include a camera, a laser imaging detection and ranging (LiDAR), and a radar. The sensor group 10 may further include a state sensor 12 that detects a state of the vehicle 1, a position sensor 13 that detects a position of the vehicle 1, and the like. Examples of the state sensor 12 include a speed sensor, an accelerometer, a yaw rate sensor, and a steering angle sensor. As the position sensor 13, a global navigation satellite system (GNSS) sensor is exemplified.

The sensor detection information SEN is information obtained by the sensor group 10. For example, the sensor detection information SEN includes an image captured by a camera. As another example, the sensor detection information SEN may include point group information obtained by LiDAR. The sensor detection information SEN may include vehicle state information indicating the state of the vehicle 1. The sensor detection information SEN may include position information indicating the position of the vehicle 1.

The autonomous driving device 20 includes a recognizer 21, a planner 22, and a control amount calculator 23.

The recognizer 21 receives the sensor detection information SEN. The recognizer 21 recognizes the situation around the vehicle 1 based on the information obtained by the recognition sensor 11. For example, the recognizer 21 recognizes an object around the vehicle 1. Examples of the object include a pedestrian, another vehicle (preceding vehicle, parked vehicle, or the like), a white line, a road structure (for example, a guard rail or a curb), a fallen object, a traffic light, an intersection, and a sign. The recognition result information RES indicates a recognition result by the recognizer 21. For example, the recognition result information RES includes object information indicating the relative position and the relative speed of the object with respect to the vehicle 1.

The planner 22 receives recognition result information RES from the recognizer 21. The planner 22 may receive vehicle state information, position information, and map information generated in advance. The map information may be high-precision three dimensional map information. The planner 22 generates a travel plan of the vehicle 1 based on the received information. The travel plan may be for reaching a destination set in advance or for avoiding a risk. Examples of the travel plan include maintaining the current travel lane, changing lanes, passing, turning right or left, steering, accelerating, decelerating, and stopping. Further, the planner 22 generates a target trajectory TRJ required for the vehicle 1 to travel in accordance with the travel plan. The target trajectory TRJ includes a target position and a target velocity.

The control amount calculator 23 receives the target trajectory TRJ from the planner 22. The control amount calculator 23 calculates a control amount CON required for the vehicle 1 to follow the target trajectory TRJ. The control variable CON can also be described as a control variable which is required to reduce the deviation between the vehicle 1 and the target trajectory TRJ. The control amount CON includes at least one of a steering control amount, a driving control amount, and a braking control amount.

The recognizer 21 includes at least one of a rule-based model and a machine learning model. The rule-based model performs recognition processing based on a predetermined rule group. Examples of the machine learning model include a neural network (NN), a support vector machine (SVM), a regression model, and a decision tree model. The NN may be a convolutional neural network (CNN), a recurrent neural network (RNN), or a combination thereof. The type of each layer, the number of layers, and the number of nodes in the NN are arbitrary. The recognizer 21 performs recognition processing by inputting the sensor detection information SEN to the model. The recognition result information RES is output from the model or generated based on the output from the model.

The planner 22 also includes at least one of a rule-based model and a machine learning model. The planner 22 performs planning processing by inputting the recognition result information RES to the model. The target trajectory TRJ is output from the model or generated based on the output from the model.

Similarly, the control amount calculator 23 includes at least one of the rule base model and the machine learning model. The control amount calculator 23 performs the control amount calculation process by inputting the target trajectory TRJ to the model. The control amount CON is output from the model or generated based on the output from the model.

Two or more of the recognizer 21, the planner 22, and the control amount calculator 23 may be integrally configured. All of the recognizer 21, the planner 22, and the control amount calculator 23 may be integrally configured (End-to-End configuration). For example, the recognizer 21 and the planner 22 may be integrally configured by an NN that outputs the target trajectory TRJ from the sensor detection information SEN. Even in the case of the integrated configuration, intermediate products such as the recognition result information RES and the target trajectory TRJ may be output. For example, when the recognizer 21 and the planner 22 are integrally configured by the NN, the recognition result information RES may be an output of an intermediate layer of the NN.

In the present embodiment, a machine learning model is used in at least a part of the recognizer 21, the planner 22, and the control amount calculator 23 that constitute the autonomous driving device 20. That is, at least one of the recognizer 21, the planner 22, and the control amount calculator 23 includes a machine learning model. The autonomous driving device 20 performs at least a part of information processes for autonomous driving of the vehicles 1 using the machine learning model.

The vehicle controller 30 includes a steering driver 31, a driving driver 32, and a braking driver 33. The steering driver 31 supplies a control signal to a steering device that steers the wheels. For example, the steering device includes an electric power steering (EPS) device. The driver 32 inputs a control signal to a driving device that generates a driving force. Examples of the drive device include an engine, an electric motor, and an in-wheel motor. The braking driver 33 supplies a control signal to a braking device that generates a braking force. The vehicle controller 30 receives a control amount CON output from the autonomous driving device 20. The vehicle controller 30 operates at least one of the steering driver 31, the driving driver 32, and the braking driver 33 with the control amount CON as a target value. Thus, the vehicle 1 travels so as to follow the target trajectory TRJ.

Figure 2:
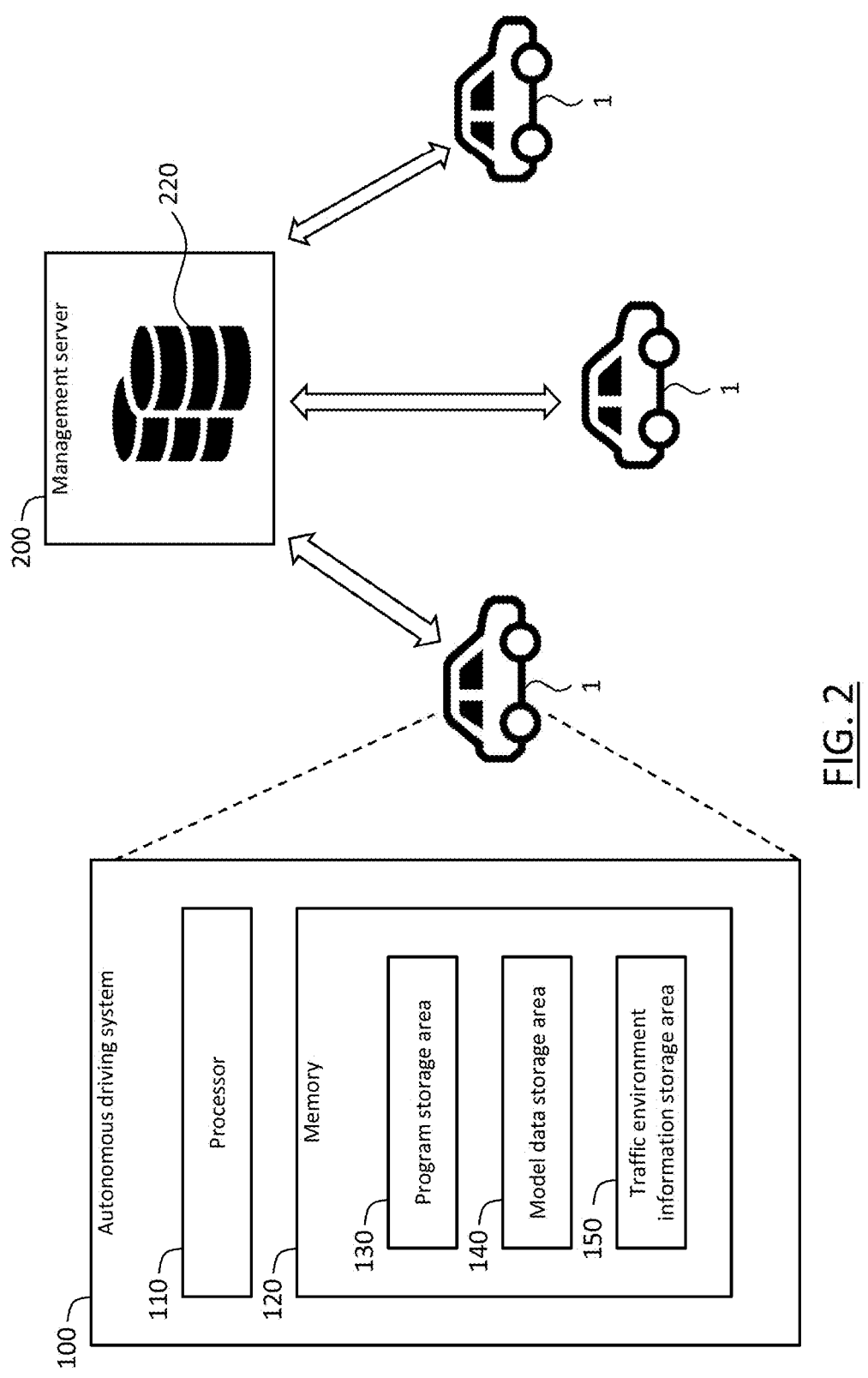
FIG. 2 is a conceptual diagram illustrating a configuration example of an autonomous driving system according to the embodiment.

FIG. 2 is a conceptual diagram illustrating a configuration example of the autonomous driving system 100 according to the present embodiment. The autonomous driving system 100 is mounted on the vehicle 1 and performs information processing for autonomous driving of the vehicle 1. The autonomous driving system 100 has at least the function of the autonomous driving device 20 described above. Further, the autonomous driving system 100 may include the sensor group 10 and the vehicle controller 30.

The autonomous driving system 100 includes one or more processors 110 (hereinafter, simply referred to as a processor 110). The processor 110 executes various processes. Examples of the processor 110 include a central processing unit (CPU), an application specific integrated circuit (ASIC), and a field-programmable gate array (FPGA). The recognizer 21, the planner 22, and the control amount calculator 23 may be implemented by a single processor 110 or may be implemented by separate processors 110. In addition, in a case where the autonomous driving system 100 includes the vehicle controller 30, the autonomous driving device 20 and the vehicle controller 30 may be realized by the single processor 110 or may be realized by the separate processors 110. It should be noted that the different processors 110 may include different types of processors 110.

The autonomous driving system 100 includes one or more memory 120 (hereinafter, simply referred to as memory 120). Examples of the memory 120 include a hard disk drive (HDD), a solid state drive (SSD), a volatile memory, and a non-volatile memory. The memory 120 includes at least a program storage area 130, a model-data storage area 140, and a traffic-environment-information storage area 150. The program storage area 130, the model-data storage area 140, and the traffic-environment-information storage area 150 may be implemented by a single memory 120 or may be implemented by separate memory 120. It should be noted that the separate memory 120 may include different types of memory 120.

The program storage area 130 stores one or more programs. Each program is composed of a plurality of instructions. The program is a computer program for controlling the vehicle 1, and is executed by the processor 110. Various processes by the autonomous driving system 100 may be realized by cooperation between the processor 110 that executes a program and the memory 120. The program may be recorded in a computer-readable recording medium.

The model data storage area 140 stores model data used for autonomous driving. The model data is data of a model included in the recognizer 21, the planner 22, and the control amount calculator 23. As described above, in the present embodiment, at least one of the recognizer 21, the planner 22, and the control amount calculator 23 includes a machine learning model, but these have already been trained (hereinafter, a trained machine learning model is simply referred to as a trained model). The machine learning model for autonomous driving that is provided in advance in the autonomous driving device 20 is a global model common to all vehicles. The trained model is a local model obtained by performing adaptive learning on the global model. Learning data obtained by actually driving the vehicle 1 is used for adaptive learning. The parameters of the trained model are stored as model data in the model data storage area 140.

The traffic environment information storage area 150 stores various kinds of information on traffic environments. Specifically, the traffic environment information includes weather information, information of sensors installed on the route, and information of in-vehicle sensors of other vehicles that have traveled on candidate routes that can be selected by the vehicle 1. The weather information includes, for example, information of a rain cloud radar and a short-term weather forecast. The information of the installed sensors on the route includes, for example, information of a monitoring camera and information obtained from a road traffic information system. The information obtained from the road traffic information system includes, for example, traffic jam information, information on the white line condition of the road, information on the route and the place where the construction is being performed, and the like. The information of the in-vehicle sensor of the other vehicle includes, for example, acceleration information, speed information, information on the recognized object, and the like. The traffic environment information may be directly acquired by the in-vehicle device, or may be acquired from the management server 200 as necessary.

The management server 200 is an external device that is present outside the vehicle 1. The management server 200 communicates with one or more vehicles 1 via a communication network. The management server 200 includes a database 220. The database 220 stores a part or all of the traffic environment information required by the vehicle 1. The traffic environment information stored in the database 220 includes information of the in-vehicle sensor uploaded from one or a plurality of vehicles 1. The processor 110 of the vehicle 1 can download necessary information from the traffic environment information stored in the database 220 to the traffic environment information storage area 150 by accessing the management server 200.

2. Simulation of Autonomous Driving Reliability

The trained model is learned under various traffic environments. However, not all possible traffic environments are reflected in the trained model, and the degree of reflection of the traffic environment in the trained model varies depending on the frequency of encounter during training. That is, the parameters of the trained model differ depending on the conditions under which the learning is performed. Therefore, depending on the traffic environment encountered during autonomous driving, the reliability of autonomous driving using the trained model may decrease, and a situation may occur in which the user is forced to perform manual driving. However, in a situation where the autonomous driving cannot be continued, it may be difficult for the user to drive the vehicle.

Therefore, in the present embodiment, in order to ensure predictability regarding whether or not to execute autonomous driving, a simulation is performed regarding the reliability of traveling by autonomous driving along a route from the current location to the destination. By displaying the result of the simulation to the user, the user can select a route for traveling by autonomous driving after understanding the risk of a driving change in advance.

Figure 3:
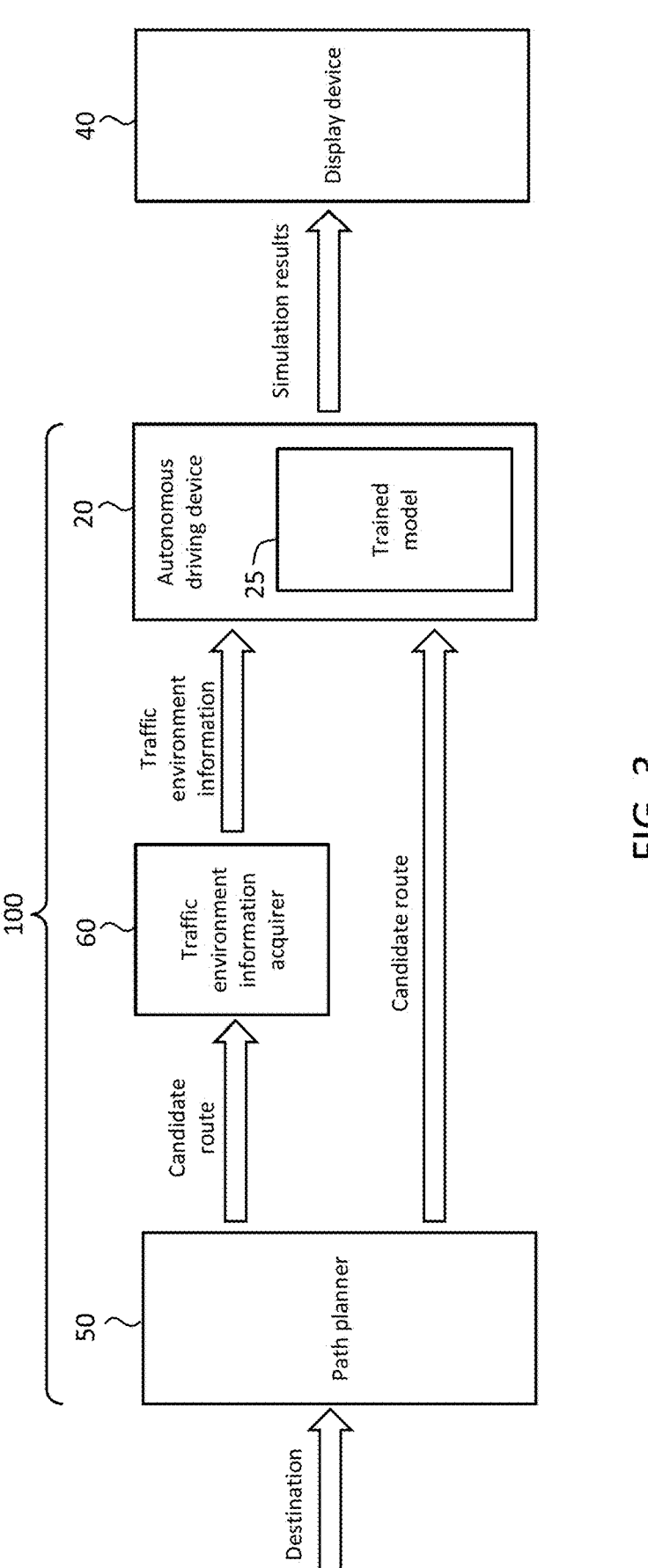
FIG. 3 is a block diagram illustrating a configuration example related to simulation of reliability of autonomous driving according to the embodiment.

FIG. 3 is a block diagram illustrating a configuration example related to the simulation of the reliability of the autonomous driving according to the present embodiment. The simulation of the reliability of the autonomous driving is performed by the autonomous driving system 100. More specifically, the autonomous driving system 100 performs simulation using the trained model 25 included in the autonomous driving device 20. In the following description, it is assumed that each of the recognizer 21, the planner 22, and the control amount calculator 23 includes a trained model, and a set of the trained models is the trained model 25.

The autonomous driving system 100 further includes a route planner 50 and a traffic environment information acquirer 60 for the simulation of the reliability of the autonomous driving. The route planner 50 has map information, and searches for one or more candidate routes from the current location to the destination location in response to an input of the destination location. The route planner 50 may be an in-vehicle navigation device. The traffic environment information acquirer 60 acquires traffic environment information for each candidate route retrieved by the route planner 50. Some of the traffic environment information can be acquired by the in-vehicle device of the vehicle 1, and some of the traffic environment information can be acquired from the management server 200. The acquired traffic environment information is temporarily stored in the traffic environment information storage area 150.

The one or more candidate routes retrieved by the route planner 50 are input to the trained model 25 of the autonomous driving device 20 together with the traffic environment information for each candidate route acquired by the traffic environment information acquirer 60. In the trained model 25, a simulation for determining whether or not autonomous driving is possible for each candidate route is performed based on the traffic environment information. In the determination of whether or not the autonomous driving is possible, not only the traffic environment information and the prediction information at the time of the determination but also the past record information may be considered.

The trained model 25 is subjected to adaptive learning based on learning data obtained during running. Therefore, the trained model 25 reflects the vehicle state such as whether or not the vehicle 1 is wound with a chain, whether or not the tire is custom, and the degree of wear of the tire. Whether the vehicle 1 can travel on a certain route by autonomous driving depends deeply on the relationship between the vehicle state and the traffic environment. Therefore, by simulating the reliability of autonomous driving using the trained model 25 that has been subjected to adaptive learning, high predictability of whether autonomous driving is possible can be ensured.

The result of the simulation by the trained model 25 is displayed on a display device 40. The display device 40 may be, for example, an information display provided in an instrument panel. An example of the simulation result displayed on the display device 40 will be described below.

2-1. First Example

Figure 4B:
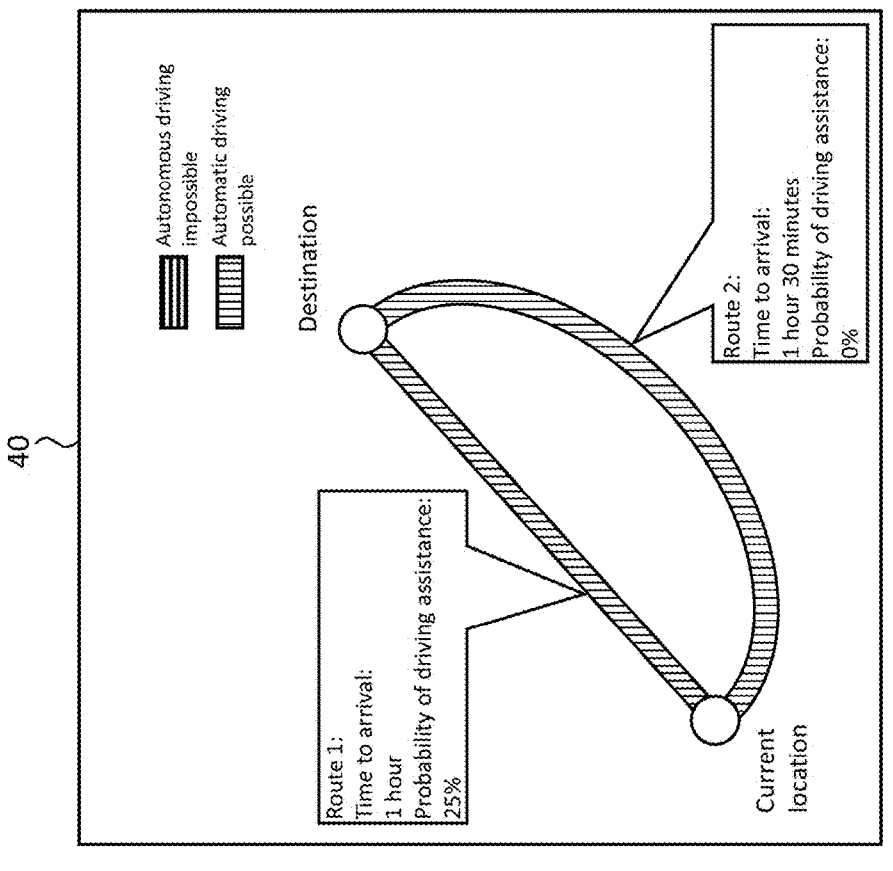
FIG. 4B is a conceptual diagram for explaining a second example of simulation results according to the embodiment.
Figure 4A:
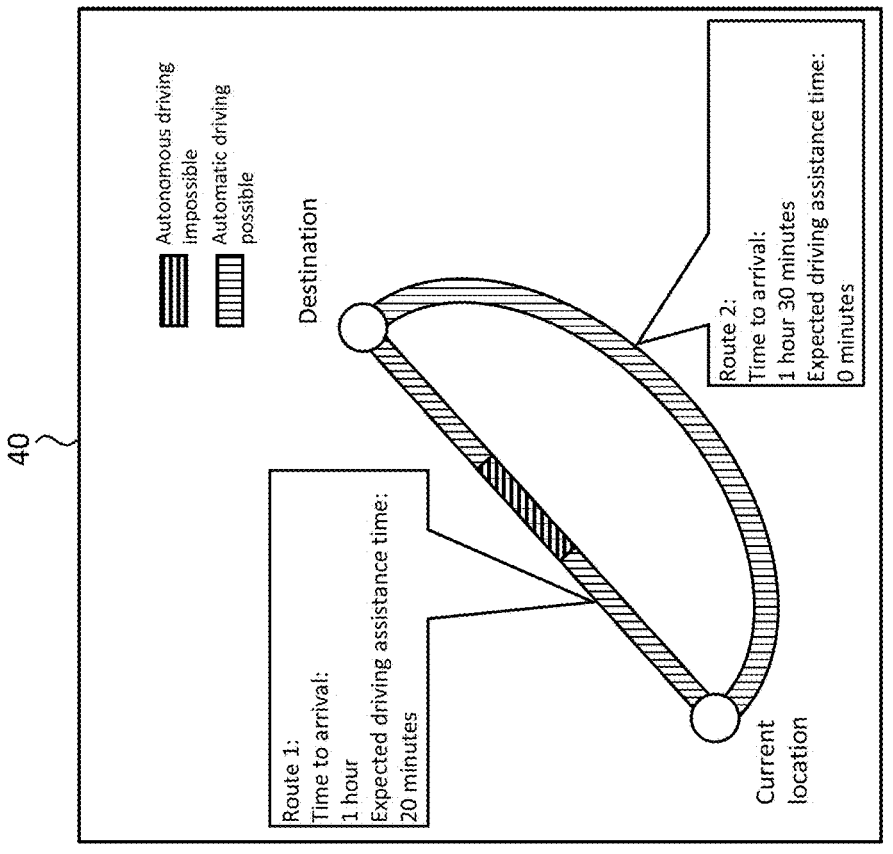
FIG. 4A is a conceptual diagram for explaining a first example of simulation results according to the embodiment.

FIG. 4A is a conceptual diagram for explaining a first example of the simulation result displayed on the display apparatus 40. In the first example, simulation based on the traffic environment information is performed for each candidate route, and a section in which autonomous driving is possible and a section in which autonomous driving is not possible, that is, a section in which assistance of driving by the user is requested are determined. Then, for each candidate route, a time until the vehicle 1 arrives at the destination and a time during which the user is expected to assist in driving (hereinafter, referred to as an expected driving assistance time) are calculated.

The candidate routes are displayed on the display device 40. Then, the section where the autonomous driving is possible and the section where the autonomous driving is not possible in each candidate route are displayed in a distinguishable manner by changing the display color, for example. The display device 40 displays the time until the vehicle arrives at the destination and the expected driving assistance time for each candidate route.

In the example shown in FIG. 4A, two candidate routes are displayed on the display 40. When the route 1 is selected, the vehicle can arrive at the destination in a shorter time than when the route 2 is selected. However, since the route 1 includes a section in which autonomous driving is not possible, the user needs to drive the vehicle 1 by himself/herself on the way. Based on these pieces of information, the user selects one of the candidate routes displayed on the display device 40. If the user is not good at driving, the user can move to the destination by autonomous driving even if the user takes a detour by selecting the route 2.

2-2. Second Example

FIG. 4B is a conceptual diagram for explaining a second example of the simulation result displayed on the display apparatus 40. In the second example, for each candidate route, simulation based on the traffic environment information is performed, and a section in which autonomous driving is possible and a section in which autonomous driving is not possible are determined. Whether or not the autonomous driving is possible is determined by a probability that the driving assistance by the user occurs (hereinafter, referred to as a driving assistance occurrence probability). If the driving assistance occurrence probability is equal to or less than the threshold value, it is determined that the autonomous driving is possible, and if the driving assistance occurrence probability is greater than the threshold value, it is determined that the autonomous driving is not possible.

The threshold value of the driving assistance occurrence probability may be set to an arbitrary value (for example, 30%).

The candidate routes are displayed on the display device 40. Then, the section where the autonomous driving is possible and the section where the autonomous driving is not possible in each candidate route are displayed in a distinguishable manner by changing the display color, for example. The section in which the autonomous driving is possible is a section in which the driving assistance occurrence probability is equal to or less than a threshold. The section in which the autonomous driving is not possible is a section in which the driving assistance occurrence probability is larger than the threshold. The display device 40 displays the time until the vehicle arrives at the destination and the maximum probability of driving assistance in the route for each candidate route.

In the example shown in FIG. 4B, two candidate routes are displayed on the display 40. Neither route 1 nor route 2 includes a section in which autonomous driving is not possible. However, when the driving assistance occurrence probabilities are compared, the driving assistance occurrence probability of the route 1 is higher than that of the route 2. If the user desires to move to the destination by autonomous driving, the user can more reliably move to the destination by autonomous driving by selecting route 2.

2-3. Third Example

Figures 5A, 5B:
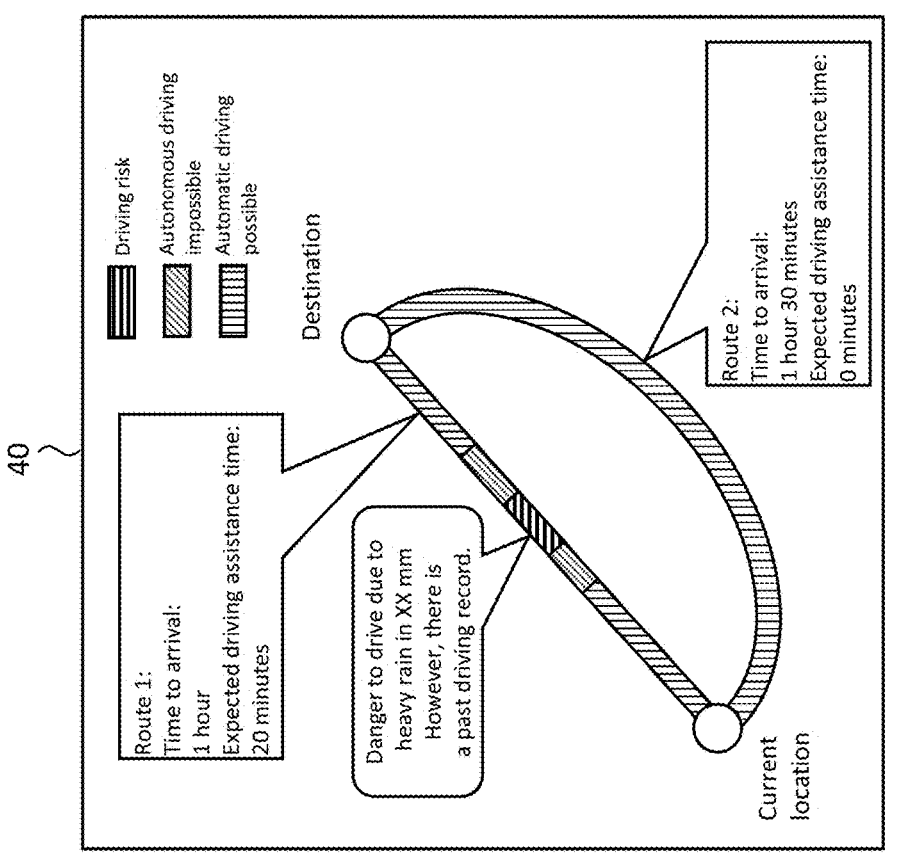
FIG. 5A is a conceptual diagram for explaining a third example of simulation results according to the embodiment.
FIG. 5B is a conceptual diagram for explaining a fourth example of simulation results according to the embodiment.

FIG. 5A is a conceptual diagram for explaining a third example of the simulation result displayed on the display apparatus 40. In the third example, for each candidate route, simulation based on the traffic environment information is performed, and a section in which autonomous driving is possible and a section in which autonomous driving is not possible are determined. Further, for a section in which autonomous driving is not possible, it is determined whether or not the section is a section in which autonomous driving is not possible but driving assistance by the driving assistance system is possible. The driving support by the driving support system means the autonomous driving at a low level of level 2 or less.

The candidate routes are displayed on the display device 40. Then, the section where the autonomous driving is possible, the section where the autonomous driving is impossible, and the section where the driving support is possible in each candidate route are displayed in a distinguishable manner by changing the display color, for example. The section in which the autonomous driving is not possible means a section in which neither the autonomous driving nor the driving support by the driving support system is possible. The section in which the driving support is possible means a section in which the autonomous driving is impossible but the driving support by the driving support system is possible. The display device 40 displays the time until the vehicle arrives at the destination and the expected driving assistance time for each candidate route. The expected driving assistance time includes a time during which the user drives while receiving driving assistance from the driving assistance system.

In the example shown in FIG. 5A, two candidate routes are displayed on the display 40. The user needs to drive the vehicle regardless of which of the route 1 and the route 2 is selected. When the route 1 is selected, the vehicle can arrive at the destination in a shorter time than when the route 2 is selected. In addition, the time for which the user needs to drive the vehicle 1 by himself/herself is shorter in the route 1 than in the route 2. However, in route 2, the section where the user needs to drive is a section where the driving support is possible, whereas route 1 includes a section where neither the autonomous driving nor the driving support is possible. The user can determine which candidate route should be selected based on such display contents.

2-4. Fourth Example

FIG. 5B is a conceptual diagram for explaining a fourth example of the simulation result displayed on the display apparatus 40. In the fourth example, for each candidate route, a simulation based on the traffic environment information is performed, and a section in which autonomous driving is possible and a section in which autonomous driving is not possible are determined. Further, for a section where autonomous driving is impossible, it is determined whether or not the section is dangerous for driving. The section where driving is dangerous means a section where driving is dangerous even if the user manually drives the vehicle. In a situation where autonomous driving is impossible, there is a possibility that driving cannot be performed safely even if the user takes over driving.

The candidate routes are displayed on the display device 40. Then, the section where the autonomous driving is possible, the section where the autonomous driving is impossible, and the section where the driving is dangerous in each candidate route are displayed in a distinguishable manner by changing the display color, for example. For a section where driving is dangerous, the reason for the determination that the section is dangerous is displayed, and the driving record of the past manual driving is displayed. The displayed driving record may include a time zone in which the driving is performed and weather at that time. The display device 40 displays the time until the vehicle arrives at the destination and the expected driving assistance time for each candidate route. The expected driving assistance time includes a time during which the user manually drives the dangerous driving section.

In the example shown in FIG. 5B, two candidate routes are displayed on the display 40. When the route 1 is selected, the vehicle can arrive at the destination in a shorter time than when the route 2 is selected. However, in the middle of the route 1, there is a section where the user has to drive the vehicle 1 by himself/herself, and the section includes a section where the driving is determined to be dangerous. In such a case, the user decides whether to select the route 1. The reason why the driving is determined to be dangerous and the presence or absence of the driving record in the section are useful information for the user to determine which candidate route should be selected.

2-5. Fifth Example

Figure 6B:
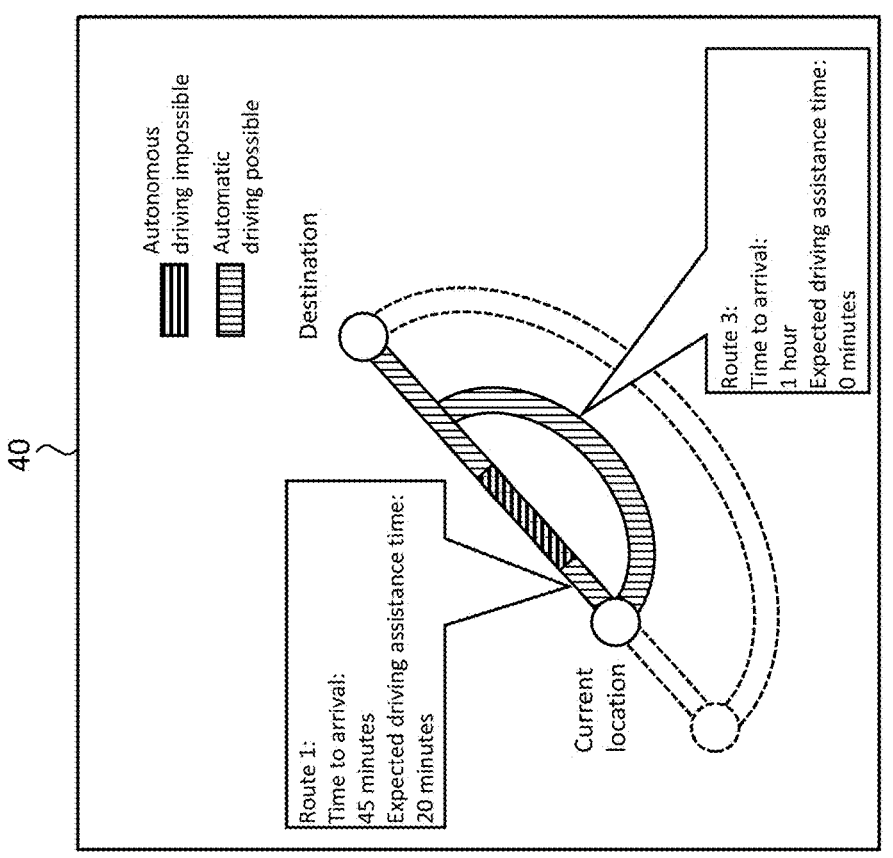
FIG. 6B is another conceptual diagram for explaining the fifth example of simulation results according to the embodiment.
Figure 6A:
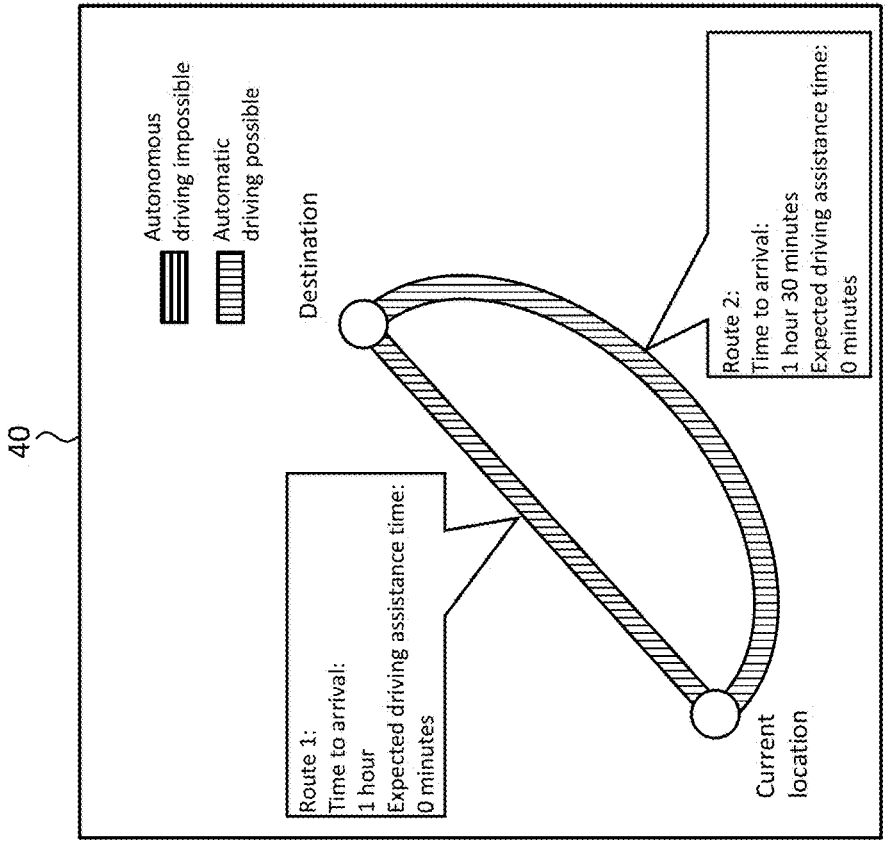
FIG. 6A is a conceptual diagram for explaining a fifth example of simulation results according to the embodiment.

FIG. 6A and FIG. 6B are conceptual diagrams for explaining a fifth example of the simulation result displayed on the display apparatus 40. In the fifth example, for each candidate route, simulation based on the traffic environment information is performed, and a section in which autonomous driving is possible and a section in which autonomous driving is not possible are determined. Further, after the start of the driving, the candidate route is periodically or irregularly re-searched. Then, simulation is performed based on the updated traffic environment information for the candidate route obtained by the re-search, and a section in which autonomous driving is possible and a section in which autonomous driving is not possible are determined. In addition, the time until the vehicle 1 arrives at the destination and the assumed driving assistance time are recalculated every time the re-simulation is performed.

In the example shown in FIG. 6A, two candidate routes are displayed on the display 40. At this point, the user does not need to drive the vehicle regardless of which of the route 1 and the route 2 is selected, and it is expected that the vehicle can travel to the destination by autonomous driving. It is expected that the destination can be reached in a shorter time when the route 1 is selected than when the route 2 is selected. Therefore, in the example shown in FIG. 6A, it is assumed that the route 1 is selected by the user.

In the example shown in FIG. 6B, two candidate routes newly retrieved after the elapse of time from the state shown in FIG. 6A are displayed on the display unit 40. The route 1 is the candidate route currently selected, and the route 3 is the candidate route newly retrieved. The traffic environment may change as time passes. Therefore, the section in which the autonomous driving was possible at the time of the previous determination may be in a state in which the autonomous driving is impossible at the present time. Conversely, the section in which the autonomous driving was not possible at the time of the previous determination may be in a state in which the autonomous driving is possible at the present time. For example, the route 1 did not include a section in which the autonomous driving was not possible in the previous determination, but the route 1 includes a section in which the autonomous driving is not possible in the current determination. On the other hand, the newly retrieved route 3 does not include a section in which autonomous driving is not possible. When the route 3 is selected, the time until the vehicle arrives at the destination is longer than when the route 1 is selected, but the vehicle can move to the destination by autonomous driving. Based on these pieces of information, the user reselects one of the candidate routes displayed on the display device 40.

2-6. Sixth Example

Two or more of the first to fifth examples described above may be combined. For example, in the third to fifth examples, the driving assistance occurrence probability may be displayed as in the second example instead of displaying the expected driving assistance time. In the third and fourth examples, the candidate route may be periodically or irregularly re-searched as in the fifth example, and the re-simulation may be performed based on the updated traffic environment information for each re-searched candidate route. In the third example, a section in which driving is dangerous may be displayed as in the fourth example.

What is claimed is:
1. A vehicle travelable by autonomous driving, comprising:
  at least one processor; and
  a memory storing a plurality of instructions executed on the at least one processor,
  wherein the plurality of instructions are configured to cause the at least one processor to execute:
  selecting one of a plurality of candidate routes to autonomously drive to a destination,
  controlling the vehicle to autonomously drive in accordance with the selected one of the plurality of candidate routes,
  acquiring information on a traffic environment of the selected candidate route, calculating, for each of the plurality of candidate routes, a time until the vehicle arrives at the destination and a time during which a user is expected to assist in driving, simulating reliability in a case where the vehicle travels on the selected candidate route by the autonomous driving based on the information on the traffic environment by using a trained model for autonomous driving, the trained model reflecting a vehicle state including whether the vehicle is wound with a chain, whether a tire of the vehicle is custom, and a degree of wear of the tire, outputting a result of the simulation, updating the information on the traffic environment after a time has elapsed from execution of the simulation, re-simulating the reliability using the trained model for the autonomous driving based on the updated information on the traffic environment, outputting a result of the re-simulation, recalculating a time until the vehicle arrives at the destination and an assumed driving assistance time every time the re-simulation is performed, controlling the vehicle to autonomously drive in at least one route including a section in which the autonomous driving is not possible, and controlling the vehicle to autonomously drive to the destination in response to selecting another candidate route that corresponds to a detour from the at least one route, and determining whether the autonomous driving is possible by a probability that the driving assistance by the user occurs, the autonomous driving is possible corresponding to a case in which a driving assistance occurrence probability is equal to or less than a threshold value that is set at 30%.

2. The vehicle according to claim 1, wherein the plurality of instructions are configured to cause the at least one processor to further execute:

performing adaptive learning on a model for the autonomous driving based on learning data obtained during traveling, and using an adaptive learned model for the autonomous driving as the trained model for the autonomous driving.

3. The vehicle according to claim 1, wherein the outputting the result of the simulation comprises:

dividing the selected candidate route into the section in which the autonomous driving is possible and another section in which the autonomous driving is not possible based on the reliability, and displaying each section on the selected candidate route.

4. The vehicle according to claim 3, wherein the plurality of instructions are configured to cause the at least one processor to further execute:

identifying an inoperable section in which driving itself is not possible based on the information on the traffic environment, and displaying the inoperable section on the selected candidate route.

\* \* \* \* \*